(12) United States Patent
Noirot et al.

(10) Patent No.: US 7,918,082 B2
(45) Date of Patent: Apr. 5, 2011

(54) METHOD AND DEVICE INTENDED FOR DESULFATION OF A NITRIC OXIDE TRAP AND REGENERATION OF A PARTICLE FILTER

(75) Inventors: Rémi Noirot, Garchizy (FR); Michel Castagne, Nanterre (FR); Jean-Baptiste Dementhon, Paris (FR)

(73) Assignees: Institut Francais du Petrole, Cedex (FR); Peugeot Citroen Automobiles SA, PCA SA, Velizy-Villacoublay (FR)

( * ) Notice: Subject to any disclaimer, the term of this patent is extended or adjusted under 35 U.S.C. 154(b) by 0 days.

(21) Appl. No.: 10/995,374

(22) Filed: Nov. 24, 2004

(65) Prior Publication Data
US 2005/0109021 A1 May 26, 2005

(30) Foreign Application Priority Data
Nov. 24, 2003 (FR) .................................. 03 13832

(51) Int. Cl.
*F01N 3/00* (2006.01)
(52) U.S. Cl. ............... 60/274; 60/285; 60/286; 60/295; 60/297; 60/303
(58) Field of Classification Search .............. 60/274, 60/277, 285, 286, 295, 297, 300, 303, 311
See application file for complete search history.

(56) References Cited

U.S. PATENT DOCUMENTS

| 5,974,791 | A * | 11/1999 | Hirota et al. ............ 60/276 |
| 6,637,189 | B1 * | 10/2003 | Boegner et al. ............ 60/274 |
| 6,758,036 | B1 * | 7/2004 | Molinier ............ 60/286 |
| 6,813,882 | B2 * | 11/2004 | Hepburn et al. ............ 60/286 |
| 6,820,414 | B2 * | 11/2004 | Stroia et al. ............ 60/286 |
| 6,823,664 | B2 * | 11/2004 | Nakatani et al. ............ 60/295 |
| 6,938,411 | B2 * | 9/2005 | Hoffmann et al. ............ 60/295 |
| 6,962,045 | B2 * | 11/2005 | Kitahara et al. ............ 60/295 |
| 6,973,775 | B2 * | 12/2005 | Hoffmann et al. ............ 60/286 |
| 7,165,394 | B2 * | 1/2007 | Toshioka et al. ............ 60/295 |
| 2003/0113249 | A1 | 6/2003 | Hepburn et al. |
| 2003/0213235 | A1 | 11/2003 | Kitahara et al. |
| 2004/0112046 | A1 * | 6/2004 | Tumati et al. ............ 60/297 |
| 2004/0123590 | A1 * | 7/2004 | Tabata et al. ............ 60/295 |
| 2004/0261401 | A1 * | 12/2004 | Ohkl et al. ............ 60/285 |

FOREIGN PATENT DOCUMENTS

| DE | 198 50 757 A1 | 11/1998 |
| DE | 101 26 455 A1 | 12/2002 |
| EP | 0 862 941 A2 | 9/1998 |
| EP | 0 862 941 A3 | 12/1998 |
| EP | 1 086 741 A2 | 3/2001 |
| EP | 1 086 741 A3 | 1/2002 |
| WO | WO 03/031780 A1 | 4/2003 |

* cited by examiner

*Primary Examiner* — Tu M Nguyen
(74) *Attorney, Agent, or Firm* — Antonelli, Terry, Stout & Kraus, LLP.

(57) ABSTRACT

A method is intended for desulfation of a nitric oxide trap (22) and regeneration of a particle filter (24) arranged in an exhaust line (20) for treating exhaust gas from an internal-combustion engine (10), notably a Diesel engine. The saturation rate of the trap and the clogging rate of the filter are evaluated and, as soon as one of the rates reaches a threshold value, the fuel/air ratio of the exhaust gas is increased without it reaching a fuel/air ratio of 1, then desulfation of trap (22) is performed in association with regeneration of particle filter (24).

15 Claims, 1 Drawing Sheet

METHOD AND DEVICE INTENDED FOR DESULFATION OF A NITRIC OXIDE TRAP AND REGENERATION OF A PARTICLE FILTER

FIELD OF THE INVENTION

The present invention relates to a method intended for desulfation of a catalyst in which nitric oxides are accumulated, which is referred to as NOx trap and associated with a regeneratable particle filter.

The NOx trap is generally used in an exhaust line of an internal-combustion engine, in particular a Diesel engine.

BACKGROUND OF THE INVENTION

Desulfation of such a trap is essential to maintain a lasting NOx conversion activity, due essentially to its progressive poisoning by the sulfur contained in the fuel and carried by the exhaust gas flowing therethrough. This phenomenon takes place whatever the sulfur content of the fuel, even with sulfur contents below 10 ppm.

To carry out the desulfation operations, it is necessary to heat the trap to a temperature higher than a predetermined temperature (generally above 600° C.) for about 10 minutes, generally by means of an exhaust gas temperature increase, and to have a composition that is globally reducing for this gas so as to allow conversion of the sulfur accumulated in the trap and thus to restore its conversion activity.

This exhaust line can also comprise a particle filter whose function consists in holding back the particles present in the exhaust gas and thus to prevent discharge thereof into the atmosphere.

This filter also has to be periodically regenerated in order to keep all its filtration capacities. The regeneration operations consist in increasing the temperature of the filter to about 450° C., generally by increasing the fuel/air ratio of the exhaust gas flowing therethrough without it reaching fuel/air ratio 1, and in obtaining an oxidizing composition for this gas so as to achieve combustion of the particles kept in the filter.

Document FR-2,825,412 describes a method intended for desulfation of a NOx trap and regeneration of a particle filter.

In this document, an internal-combustion engine comprises an exhaust gas cleaning system with a NOx trap arranged upstream from a particle filter. By means of the method described, the fouling condition of the particle filter, or clogging rate, is constantly monitored and the particle filter regeneration operations are started as soon as the clogging rate has exceeded a certain threshold. During these regeneration operations, the state of sulfur saturation of the trap, or saturation rate, is examined and, if this rate has reached a predetermined value, the NOx trap desulfation operations are started at the end of the regeneration operations. In the opposite case, only the filter regeneration operations are carried out and the trap continues to accumulate the sulfur contained in the exhaust gas.

These desulfation and regeneration operations however involve quite significant drawbacks.

Notably, the particle filter efficiency can deteriorate locally and durably as a result of an excessive temperature during regeneration, leading to degradation of the filter materials, a phenomenon that occurs especially in the central part thereof. Conversely, the external part of the filter can suffer from an insufficient temperature rise, because of its proximity to the walls and of the inhomogeneous nature of the gas stream flowing through the filter, and may not be entirely freed of the particles accumulated during regeneration.

Furthermore, it has been observed that the NOx trap loses efficiency after a certain number of desulfation operations. In fact, the internal part of the grains of the storage materials that make up the trap is not very accessible to the exhaust gas during the desulfation operations, and sulfates with a very stable crystal structure at high temperatures, of the order of 900° C., form and put a definitive end to the conversion activity of these grains. To maintain a minimum conversion efficiency required and to fulfil the endurance objectives of the depollution system imposed by regulations, it is necessary to increase the frequency of the desulfation operations as the vehicle travels miles. This frequency increases further if the driving mode is often a high-load driving mode. Such a mode is often accompanied by a high fuel consumption which generates an increasing sulfur accumulation in the trap. This accumulation increase leads to an increase in the frequency of the desulfation operations, which involves a quite significant fuel consumption increase insofar as these operations require an exhaust gas fuel/air ratio above 1, of the order of 1.1, and an exhaust gas temperature above 600° C. Furthermore, passage to this fuel/air ratio and to this high temperature leads to a high combustion degradation in the engine because the air has to be throttled at the intake and the amount of fuel injected into the combustion chamber of the engine has to be increased.

Another drawback of desulfation is the discharge of sulfur compounds, notably $H_2S$, throughout the desulfation operations. This $H_2S$ discharge is malodorous and, at high concentration, it can be dangerous to man's health.

It has also been observed that, according to a major drawback of the method described in the aforementioned document, the NOx trap can be saturated long before the particle filter regeneration operations are started. The trap can therefore no longer fulfil its function and the sulfur compounds contained in the exhaust gas will be discharged into the open air without being treated.

The present invention aims to overcome the aforementioned drawbacks by means of a method intended for desulfation of a NOx trap and regeneration of a particle filter that does not penalize the fuel consumption and allows the NOx trap efficiency to be kept at a very high level throughout the life of the vehicle.

SUMMARY OF THE INVENTION

The invention thus relates to a method intended for desulfation of a nitric oxide trap and regeneration of a particle filter arranged in an exhaust line for treatment of the exhaust gas of an internal-combustion engine, notably a Diesel engine, characterized in that:
  the saturation rate of the trap and the clogging rate of the filter are evaluated,
  as soon as one of the rates reaches a threshold value, the fuel/air ratio of the exhaust gas is increased without it reaching ratio 1, then
  desulfation of the trap is carried out in association with regeneration of the particle filter.

Advantageously, regeneration of the particle filter can be carried out at the end of the trap desulfation operation.

Desulfation of the trap can be carried out by means of a rich exhaust gas mixture.

Regeneration of the filter can be carried out by means of a lean exhaust gas mixture.

During desulfation of the trap, an alternation of lean and rich exhaust gas mixture can be performed.

The temperature of the exhaust gas can be increased and the oxygen concentration of the exhaust gas can be decreased by passing said gas through a catalytic element.

The exhaust gas can be heated by an electric element arranged in the exhaust line.

The particle filter regeneration temperature can be regulated by controlling the oxygen content of the exhaust gas.

The oxygen content can be controlled by alternating periods where the exhaust gas fuel/air ratio is below 1 and periods where the fuel/air ratio is above 1.

The invention also relates to a device intended for desulfation of a nitric oxide trap and regeneration of a particle filter, arranged in an exhaust line of an internal-combustion engine, notably a Diesel engine, comprising a control unit evaluating the saturation rate of the trap and the clogging rate of the filter, characterized in that it comprises control means for associating each trap desulfation with each filter regeneration as soon as one of the rates has reached its threshold value and for increasing the fuel/air ratio of the exhaust gas without it reaching fuel/air ratio 1, prior to desulfation.

The control means can comprise combustion control means for producing a rich or a lean exhaust gas mixture.

It can comprise a catalytic element arranged upstream from the trap for increasing the temperature and decreasing the oxygen content of the exhaust gas.

It can comprise an electric element for heating the exhaust gas.

It can comprise temperature regulation means for the particle filter.

The regulation means can comprise means for varying the fuel/air ratio of the exhaust gas around a ratio 1.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
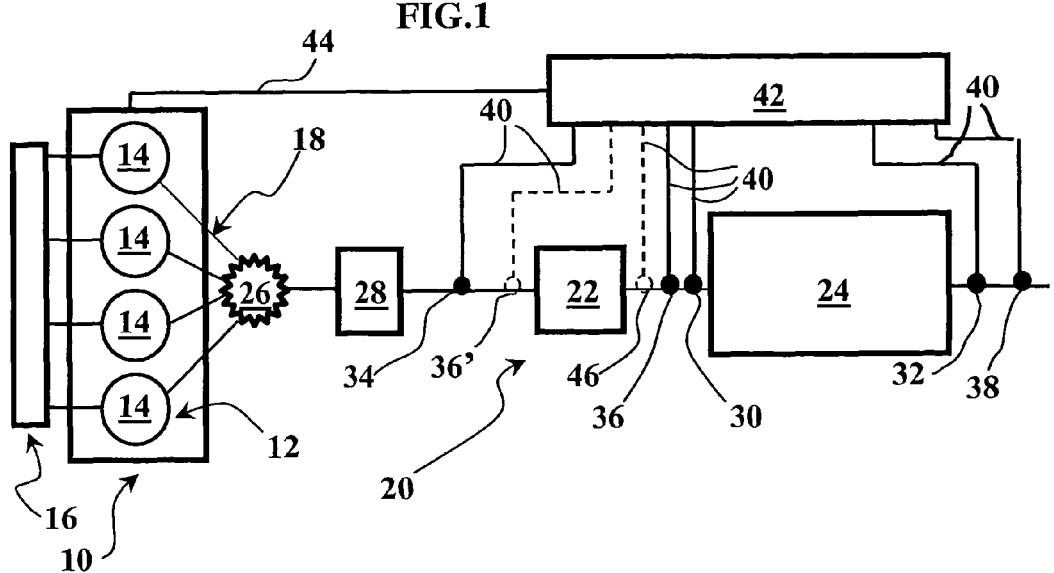
FIG. 1 diagrammatically shows an internal-combustion engine with an exhaust gas treating system.

With reference to FIG. 1, the device comprises an internal-combustion engine 10, notably a Diesel type engine, with at least one cylinder 12 comprising a combustion chamber 14, a fuel supply means 16 for the combustion chambers, air inlet means (not shown) and burnt gas exhaust means 18. The exhaust means of this engine are connected to an exhaust line 20 comprising in series, from the exhaust means, a catalyst 22 on which nitric oxides accumulate, referred to as NOx trap, arranged upstream from a particle filter 24. Advantageously, a supercharging device 26 such as a turbocompressor can be arranged between the exhaust means of the engine and the NOx trap. Similarly, an oxidation catalyst 28 can be provided upstream from the NOx trap and downstream from turbocompressor 26.

Exhaust line 20 advantageously comprises an exhaust gas temperature detector 30, referred to as upstream detector, arranged between NOx trap 22 and particle filter 24, and advantageously another exhaust gas temperature detector, referred to as downstream detector 32, arranged at the particle filter outlet. A proportional fuel/air ratio probe 34 is advantageously provided upstream from the NOx trap to measure the value of the fuel/air ratio of the exhaust gas at the NOx trap inlet. An exhaust gas pressure detector 36 is arranged upstream from the particle filter and downstream from the NOx trap, or upstream from the NOx trap (shown by reference number 36' in dotted line in the figure), and another exhaust gas pressure detector 38 is arranged downstream from the particle filter. These pressure detectors are used to measure the pressure difference of the exhaust gas between the inlet and the outlet of particle filter 24 or between the inlet of the NOx trap and the outlet of particle filter 24. It can be noted that these pressure detectors can be replaced by a single detector measuring the pressure difference between upstream and downstream from the filter.

The various detectors and probe are connected by lines 40 to a control unit 42. This unit is also connected to the engine by a bidirectional line 44 allowing to permanently know data linked with the engine running such as, for example, the engine speed. Unit 42 also transmits, through line 44, after processing the signals received from the detectors and probe, commands to the various elements of the engine allowing to act upon the running of the engine, such as fuel injection 16 and/or air intake in cylinders 12.

This control unit comprises models allowing to continuously evaluate the saturation rate of the NOx trap as a function of certain parameters, such as the composition of the fuel and the operating time of the engine, and the clogging rate of the filter as a function of the pressure drop in the filter. Furthermore, the unit comprises data tables containing threshold values of the clogging rate and of the saturation rate from which the desulfation and regeneration operations have to be started.

Alternatively to the model evaluating the saturation rate, a NOx probe 46 (shown in dotted line) can be provided downstream from trap 22 and also connected by a line 40 to control unit 42. This probe will allow to permanently know the proportion of NOx present in the exhaust gas coming from this trap. Similarly, the clogging rate of the filter can also be evaluated by means of a particle detector (not shown) arranged upstream or downstream from this filter, also connected by a line 40 to unit 42.

While the engine is running, unit 42 calculates the pressure drop of the exhaust gas between upstream from the trap and downstream from particle filter 24 by means of the upstream 36 and downstream 38 detectors, or between upstream from NOx trap 22 and downstream from particle filter 24 by means of the upstream 36' and downstream 38 detectors so as to evaluate the state of the particle load present in particle filter 24. From this information, it evaluates the clogging rate of the filter by means of the model stored in unit 42. Simultaneously, this unit evaluates the saturation rate of the NOx trap either by means of the model it contains or by means of NOx probe 46.

As soon as at least one of the rates, i.e. the clogging rate of the filter or the saturation rate of the trap, has reached a threshold value contained in the data tables of the unit, trap desulfation operations are carried out in association with filter regeneration operations, even if the other rate has not reached its threshold value.

By way of example, if the saturation rate of the NOx trap has been reached, the trap desulfation operations are carried out in association with the particle filter regeneration operations even if the filter clogging rate has not reached its threshold value. Not only is the trap thus desulfated, but the filter is regenerated before it has reached its clogging rate. This allows to put back the next regeneration period and to minimize the pressure drop of the exhaust gas flowing through the filter, a pressure drop that is harmful to the smooth running of the engine. Conversely, in case the filter clogging rate has reached its threshold value, this association of desulfation and regeneration operations is carried out even if the NOx trap has not reached its saturation rate. In this case, the external part of the NOx storage material grains is regenerated before the NOx diffuses within the grains, which allows to prolong all the more the desulfation periodicities and to keep the catalysis function of this trap lasting without progressive activity loss.

Thus, whatever the nature of the rate that has reached its threshold value (clogging rate or saturation rate), NOx trap desulfation operations are carried out jointly with particle filter regeneration operations.

Figure 2:
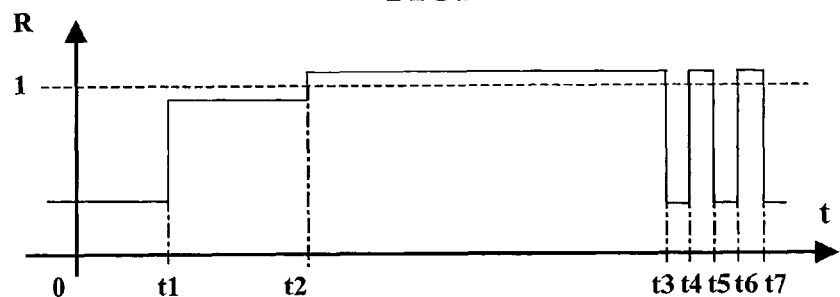
FIG. 2 is a graph showing the evolution of the fuel/air ratio of the exhaust gas (R) as a function of time (t) during the regeneration/desulfation sequences in a first method of operation.

In a first embodiment, as shown in FIG. 2 by way of example, the exhaust gas mixture, i.e. the fuel/air ratio, is lean (for example of the order of 0.3) before time t1 and it corresponds to the normal running conditions of the engine. At the time t1, when the filter and/or the trap has reached a clogging and/or saturation rate corresponding to its threshold value, the fuel/air ratio of the gas is increased while remaining below 1, generally of the order of 0.8 to 0.9, so as to raise the temperature of the exhaust gas to about 450° C. until time t2. This fuel/air ratio increase is completed, at the time t2, by a second fuel/air ratio increase so as to obtain a rich mixture, usually a ratio of about 1.1, in order to obtain an exhaust gas at a temperature of about 600° C. with a reducing composition. This fuel/air ratio is maintained at this level until time t3 to provide complete desulfation of the NOx trap. At the time t3, which substantially corresponds to the end of the desulfation operations, the fuel/air ratio of the exhaust gas is decreased so as to obtain a lean mixture at a value substantially similar to its value before time t1.

The various fuel/air ratios and temperatures of the gas are permanently controlled by unit 42 by means of temperature detectors 30 and 32, and probe 34. If necessary, this unit can send control instructions through line 44 to the various elements of the engine so as to adjust the fuel/air ratio and temperature values to those required.

To carry out the first fuel/air ratio variation at the time t1, unit 42 sends instructions to some elements of engine 10 in order to increase this ratio without it reaching ratio 1 (of the order of 0.8 to 0.9) to allow the exhaust gas to have an oxidizing composition.

By way of example, a fuel post-injection can be provided in the combustion chambers of cylinders 14 by means of fuel supply means 16.

This fuel/air ratio increase allows to raise the temperature of the exhaust gas so that it reaches a temperature close to 450° C. in order to initiate regeneration of the particle filter. After some ten seconds, at the time t2, the fuel/air ratio of the gas is increased further, for example by means of another post-injection in combustion chambers 14, so as to exceed value 1 up to about 1.1. This second fuel/air ratio increase allows to raise the temperature of the gas up to about 600° C. This fuel/air ratio is maintained for some minutes, generally between 10 and 15 min, and ends at the time t3. At this time t3, desulfation of trap 22 is performed and the temperature of the exhaust gas coming from this trap is sufficient to finalize the filter regeneration operations by combustion of the soot particles present in this filter. Furthermore, because of the high-temperature exhaust gas generated for desulfation, which have flowed through the filter, these particles are freed of the most part of their impurities, called SOF, such as the water and the hydrocarbons absorbed, and the whole of the filter, including the elements close to the walls, has reached a temperature favourable to regeneration. This accelerates all the more regeneration of the filter in relation to a usual regeneration and allows to guarantee that it is effected completely throughout the filter.

The sudden temperature rises managed by the engine control to provide a specific desulfation are thus eliminated and the fuel overconsumption is decreased. Furthermore, the formation of sulfates of stable crystal structure is minimized since desulfation of the trap occurs even if the amount of sulfur is minimal and the efficiency of the NOx trap remains at a substantially constant value. Also, this allows to limit the concentration level of the $H_2S$ discharge at the exhaust since the total sulfur accumulation in the trap is generally below 2 g/liter trap.

Advantageously, with reference to FIG. 1, oxidation catalyst 28 can be used to decrease the oxygen concentration harmful to the desulfation operations of trap 22 and contribute towards the temperature increase of the exhaust gas.

In fact, during the first fuel post-injection providing initiation of the regeneration of filter 24, large amounts of unburnt hydrocarbons (HC) and of carbon oxide (CO) are discharged at the exhaust. Catalytic conversion of these HC and CO on catalyst 28 contributes to partly consuming the oxygen contained in the exhaust gas from the combustion chambers of the engine. Thus, the oxygen concentration decrease is obtained more readily without having to increase the fuel/air ratio of the mixture and, consequently, the fuel consumption and its impact on the torque variation of the engine becomes less perceptible to the driver.

Of course, without departing from the scope of the invention, heating of the exhaust gas can be provided by any known means. Notably, an electric element heating the exhaust gas can be positioned upstream from the NOx trap.

During the regeneration operations, the particle filter can reach very high temperatures (of the order of 750° C.) and it can be seriously damaged or even destroyed.

Checking the inner thermal equipment of the particle filter during regeneration is thus necessary so that it keeps its functional integrity.

The temperature of the particle filter is therefore regulated below a limiting value through combustion control of the soots present in the filter. In practice, this is achieved by controlling the oxygen content of the exhaust gas flowing through the filter. In fact, the decrease in the oxygen content of the exhaust gas, for some seconds, allows to stop the soot oxidation reaction before the temperature of the filter exceeds the limiting temperature value. This oxygen content reduction is achieved by having an exhaust gas fuel/air ratio above 1 during periods t4-t5, t6-t7. Passage to the lean mixture, with a fuel/air ratio below 1, during periods t5-t6 of substantially equal duration as the periods with a fuel/air ratio above 1, allows to supply again the combustion of soots present in the filter with oxygen and to regenerate the filter with a sufficient temperature level without it exceeding the threshold value.

Thus, while the engine is running and more particularly at the end of the desulfation operations and during regeneration of particle filter 24, temperature detector 32 arranged downstream from this filter sends a signal representative of the exhaust gas temperature to control unit 42. When this temperature is close to or reaches a limiting value, this unit sends control signals, by means of line 44, to the various elements of the engine allowing to act upon the running of this engine, such as fuel injection 16 or the air intake, so as to modify the oxygen content of the exhaust gas. By way of example, as shown in FIG. 2, this modification consists, from time t3, in pulsing the fuel/air ratio of the exhaust gas around 1, during periods t3-t4, t4-t5, t5-t6, t6-t7, in order to regulate the oxygen content of the exhaust gas entering the filter. This alternation of lean mixture (about 0.3) and of rich mixture (of the order of 1.1) can be obtained by sending control instructions through unit 42 to fuel supply means 16 so as to produce a fuel post-injection in combustion chambers 14 at a desired time and/or to the intake means so as to limit the amount of air fed into these combustion chambers.

Figure 3:
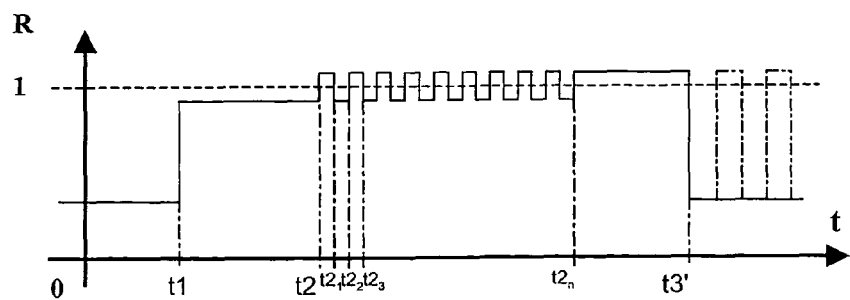
FIG. 3 is another graph showing the evolution of the fuel/air ratio of the exhaust gas (R) as a function of time (t) during the regeneration/desulfation sequences in a second method of operation.

FIG. 3 shows another embodiment of the invention.

This embodiment differs from that described in connection with FIG. 2 only in an alternation of desulfation and regeneration operations between times t2 and t3, approximately every 15 seconds for example.

This alternation could result in a desulfation time increase, but it has been decided to reduce this time by seeing to it that, from the last alternation (at time $t2_n$ before time t3'), the fuel/air ratio is kept at about 1.1 until a time t3' so that all of the sulfur contained in the trap is removed.

This allows to sustain, in the time interval required for desulfation, initiation of the filter regeneration performed between times t1 and t2. Combustion of the particles in the filter thus proceeds progressively during period $t2-t2_n$, which allows to avoid having too great an exotherm during the progress of the filter regeneration at the time t3' and to shorten the time required for regeneration of this filter. Furthermore, this alternation allows to limit the $H_2S$ discharge level during the desulfation operations so that it does not exceed about 300 ppm.

To achieve this alternation, the fuel/air ratio is increased at the time t2, as described above in connection with FIG. 2, up to about 1.1. This ratio is maintained until the time $t2_1$, then it decreases down to a value of about 0.8 to 0.9 maintained until the time $t2_2$, then it increases up to a value of 1.1 at the time $t2_3$. This alternation is repeated until the time $t2_n$, which is a function of the characteristics and the performances of the trap. During period $t2-t2_1$, the temperature and the composition of the exhaust gas is such that the trap desulfation operations take place. Between the times $t2_1$ and $t2_2$, the exhaust gas contains a minimal but sufficient amount of oxygen for burning part of the particles contained in the filter, and the gas is sufficiently reducing to continue the desulfation operations. These alternations of desulfation and regeneration operations are continued until the time $t2_n$. From this time, the fuel/air ratio is increased up to about 1.1 and it is maintained until the time t3' which corresponds to the time when all of the sulfur contained in the trap is eliminated. At the time t3', the fuel/air ratio is decreased down to about 0.3 so as to finalize the filter regeneration operations, as described above in connection with FIG. 2.

Of course, as already described in connection with this figure, it is possible to regulate the exotherm of filter 24 by pulsing the exhaust gas fuel/air ratio around 1 (shown in dotted line in the figure), at the time t3', in order to control the oxygen content of the exhaust gas flowing through the filter.

The present invention is not limited to the examples described and it includes all equivalents and variants.

The invention claimed is:

1. A method for desulfation of a nitric oxide trap and regeneration of a particle filter arranged in an exhaust line for treatment of the exhaust gas of an internal-combustion engine, comprising:
    evaluating the saturation rate of the trap and the clogging rate of the filter,
    initiating regeneration of the particle filter as soon as the clogging rate of the filter reaches a threshold value, and carrying out desulfation of the trap by increasing the fuel/air ratio of the exhaust gas to a value higher than 1 and by an alternation of exhaust gas lean mixture and rich mixture periods during desulfation of the trap, and
    initiating regeneration of the particle filter as soon as the saturation rate of the trap reaches a threshold value by increasing the fuel/air ratio of the exhaust gas without it reaching a ratio of 1, then carrying out desulfation of the trap by increasing the fuel/air ratio of the exhaust gas to a value higher than 1 and regulating the temperature of the particle filter by an alternation of exhaust gas lean mixture and rich mixture periods during desulfation of the trap.

2. A method as claimed in claim 1, characterized in that regeneration of the particle filter is finalized at the end of the trap desulfation.

3. A method as claimed in claim 1, characterized in that the temperature of the exhaust gas is increased and the oxygen content of the exhaust gas is decreased by passing said gas through a catalytic element.

4. A method as claimed in claim 1, characterized in that the exhaust gas is heated by an electric element arranged in the exhaust line.

5. A method as claimed in claim 1, wherein the internal combustion engine is a diesel engine.

6. A method for desulfation of a nitric oxide trap and regeneration of a particle filter arranged in an exhaust line for treatment of the exhaust gas of an internal-combustion engine, comprising:
    evaluating the saturation rate of the trap and the clogging rate of the filter,
    initiating regeneration of the particle filter as soon as the clogging rate of the filter reaches a threshold value, and carrying out desulfation of the trap by increasing the fuel/air ratio of the exhaust gas to a value higher than 1 and by an alternation of exhaust gas lean mixture and rich mixture periods during desulfation of the trap, and
    initiating regeneration of the particle filter as soon as the saturation rate of the trap reaches a threshold value by increasing the fuel/air ratio of the exhaust gas without it reaching a ratio of 1, then carrying out desulfation of the trap by increasing the fuel/air ratio of the exhaust gas to a value higher than 1 and by an alternation of exhaust gas lean mixture and rich mixture periods during desulfation of the trap, and regulating the regeneration temperature of the particle filter by controlling the oxygen content of the exhaust gas.

7. A method as claimed in claim 6, characterized in that the oxygen content is controlled by alternating periods where the fuel/air ratio of the exhaust gas is below 1 and periods where the fuel/air ratio is above 1.

8. A method as claimed in claim 6, wherein the internal combustion engine is a diesel engine.

9. A device for desulfation of a nitric oxide trap and regeneration of a particle filter arranged in an exhaust line of an internal-combustion engine, comprising a control unit evaluating the saturation rate of the trap and the clogging rate of the filter, characterized in that it comprises control means for associating each trap desulfation with each filter regeneration as soon as has reached its threshold value and for increasing the fuel/air ratio of the exhaust gas without it reaching a fuel/air ratio of 1 for initiating the regeneration of the particle filter, prior to desulfation, then increasing the fuel/air ratio of the exhaust gas to a value higher than 1 to carry out desulfation of the trap, and regulating the temperature of the particle filter by performing an alternation of exhaust gas lean mixture and rich mixture periods during desulfation of the trap, wherein the control means further initiates regeneration of the particle filter as soon as the clogging rate of the filter reaches a threshold value, and carries out desulfation of the trap by increasing the fuel/air ratio of the exhaust gas to a value higher than 1 and by an alternation of exhaust gas lean mixture and rich mixture periods during desulfation of the trap.

10. A device as claimed in claim 9, characterized in that the control means comprise combustion control means for producing a rich or a lean exhaust gas mixture.

11. A device as claimed in claim 9, characterized in that it comprises a catalytic element arranged upstream from the trap to increase the temperature and to decrease the oxygen content of the exhaust gas.

12. A device as claimed in claim 9, characterized in that it comprises an electric element for heating the exhaust gas.

13. A diesel engine, comprising:
   at least one cylinder;
   a fuel supply for the at least one cylinder;
   an air inlet for the at least one cylinder;
   an exhaust line connected to the at least one cylinder;
   a nitric oxide trap and a particle filter arranged in the exhaust line; and
   the device as claimed in claim 9, for desulfation of the nitric oxide trap and regenerating of the particle filter.

14. A device as claimed in claim 9, further comprising a temperature detector detecting a temperature of exhaust gas downstream of the particle filter and sending a signal representative of the temperature of the exhaust gas downstream of the particle filter to the control means.

15. A device as claimed in claim 14, characterized in that the control means initiates regeneration of the particle filter as soon as the clogging rate of the filter reaches a threshold value, and carries out desulfation of the trap by increasing the fuel/air ratio of the exhaust gas to a value higher than 1 and by an alternation of exhaust gas lean mixture and rich mixture periods during desulfation of the trap based on the signal from the temperature detector.

* * * * *